(12) United States Patent
Grau

(10) Patent No.: US 12,299,077 B2
(45) Date of Patent: May 13, 2025

(54) PERCEPTION SYSTEM ERROR DETECTION AND RE-VERIFICATION

(71) Applicant: Intel Corporation, Santa Clara, CA (US)

(72) Inventor: Oliver Grau, Voelklingen (DE)

(73) Assignee: Intel Corporation, Santa Clara, CA (US)

( * ) Notice: Subject to any disclaimer, the term of this patent is extended or adjusted under 35 U.S.C. 154(b) by 1052 days.

(21) Appl. No.: 17/030,423

(22) Filed: Sep. 24, 2020

(65) Prior Publication Data

US 2021/0018590 A1   Jan. 21, 2021

(51) Int. Cl.
*G06F 18/22* (2023.01)
*G01S 13/93* (2020.01)
*G06N 3/02* (2006.01)
*G06N 3/04* (2023.01)
*G06N 3/08* (2023.01)
*B60W 60/00* (2020.01)

(52) U.S. Cl.
CPC .............. *G06F 18/22* (2023.01); *G01S 13/93* (2013.01); *G06N 3/02* (2013.01); *G06N 3/04* (2013.01); *G06N 3/08* (2013.01); *B60W 60/001* (2020.02)

(58) Field of Classification Search
CPC .......... G06F 18/22; G01S 13/93; G06N 3/02; G06N 3/04; G06N 3/08; B60W 60/001
See application file for complete search history.

(56) References Cited

U.S. PATENT DOCUMENTS

| | | | |
|---|---|---|---|
| 9,940,717 | B2 | 4/2018 | Grau |
| 2003/0097230 | A1* | 5/2003 | Garabedian .............. G05B 9/02 |
| | | | 702/104 |
| 2019/0025773 | A1* | 1/2019 | Yang ........................ G06N 3/08 |
| 2020/0090322 | A1* | 3/2020 | Seo .......................... G06N 3/084 |
| 2020/0226426 | A1* | 7/2020 | Jarquin Arroyo ..... G06F 18/217 |

(Continued)

FOREIGN PATENT DOCUMENTS

DE    102018128535 A1    5/2020

OTHER PUBLICATIONS

Goodfellow, Ian J. et al., "Generative Adversarial Nets", Jun. 10, 2014, 9 pages, vol. 1, arXiv.

(Continued)

*Primary Examiner* — John C Kuan
(74) *Attorney, Agent, or Firm* — Viering, Jentschura & Partner mbB

(57) ABSTRACT

A sensor data evaluation device may include an artificial neural network, configured to receive and process first testing data, and output a first testing data output, wherein the first testing data represent sensor data of a first sensor detecting a sensor input; and one or more processors, configured to receive sensor deficiency information representing a deficiency of a second sensor; generate second testing data, wherein the second testing data are based on the sensor deficiency information; implement the artificial neural network to receive and process the second testing data; and output from the output layer a second testing data output; determine a difference between the first testing data output and the second testing data output; and if the difference is outside of one or more predetermined ranges or does not satisfy one or more predetermined criteria, send a signal representing a result of the determined difference.

18 Claims, 8 Drawing Sheets

(56) References Cited

U.S. PATENT DOCUMENTS

| | | | |
|---|---|---|---|
| 2020/0278665 A1* | 9/2020 | Arditti Ilitzky | G06F 17/16 |
| 2021/0117787 A1* | 4/2021 | Stal | G06N 3/04 |
| 2021/0223780 A1* | 7/2021 | Bramley | G06N 3/04 |
| 2021/0312284 A1* | 10/2021 | Dasgupta | G06N 3/045 |

OTHER PUBLICATIONS

European Search Report issued for the corresponding European patent application No. 21194027.5, dated Feb. 21, 2022, 16 pages (for informational purposes only).

* cited by examiner

FIG 7
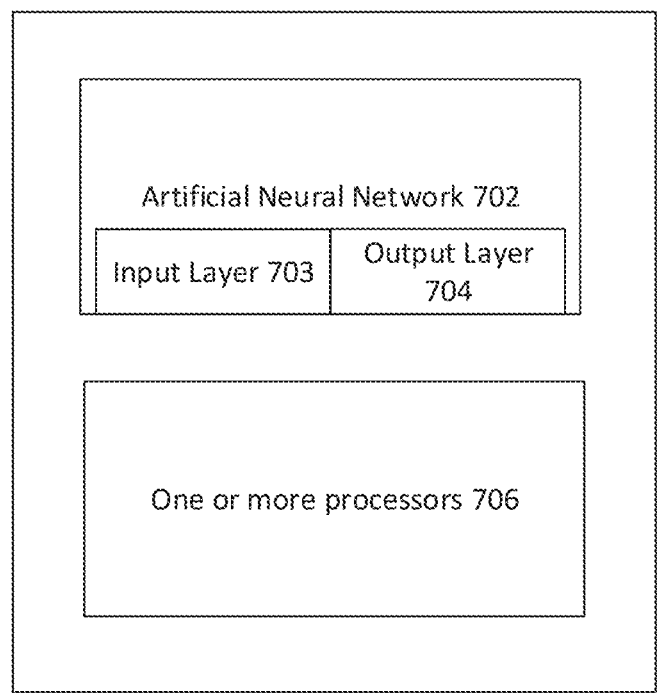
700

PERCEPTION SYSTEM ERROR DETECTION AND RE-VERIFICATION

TECHNICAL FIELD

Various aspects of this disclosure generally relate to sensor error detection, sensor degradation detection, perception system error detection, perception system retraining and/or perception system re-validation.

BACKGROUND

It is known to develop and carry out perception functions using machine learning (also referred to as Artificial Intelligence (AI)) on deep networks, such as in a data center, and then to deploy the trained AI functions in an embedded system. An embedded system may be understood as hardware and software that operate together to perform a specific function within a larger system. Such embedded systems may be operated in a variety of devices, such as, but not limited to, smart cameras, and in perception functions for autonomous systems, such as robots or autonomous vehicles.

These AI functions may be determined in a supervised learning context, such as, for example by using Deep Neural Networks. They are often trained with large data sets (e.g. large sets of annotated data), which may be very computationally demanding. Such procedures may be conventionally performed, for example, in a data center external to the embedded system device.

It may be desired for the resulting system to be validated, to assure proper functionality and safe operation. Such validation may also require significant data and considerable computational resources. Once the training is completed and a validation has been conferred, the actual AI function can be deployed, such as in the embedded system.

Such embedded systems may rely on a plurality of sensors, which may be configured to determine sensor data, and this sensor data may be input into one or more of the AI functions in a sensing operation. Many devices that include such embedded systems, however, may be expected to remain in use over a lengthy period (e.g. a period of multiple months or years), and the characteristics of such an embedded system may change over the device's lifetime, such as being due to sensor aging, sensor damage, or other sensor degradations that may result in decreased performance of the perception and/or other cognitive features of the embedded system. Such changes in performance may affect a previous validation of the embedded system.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which:

FIG. 7 depicts a sensor data evaluation device; and

DESCRIPTION

Figure 1:
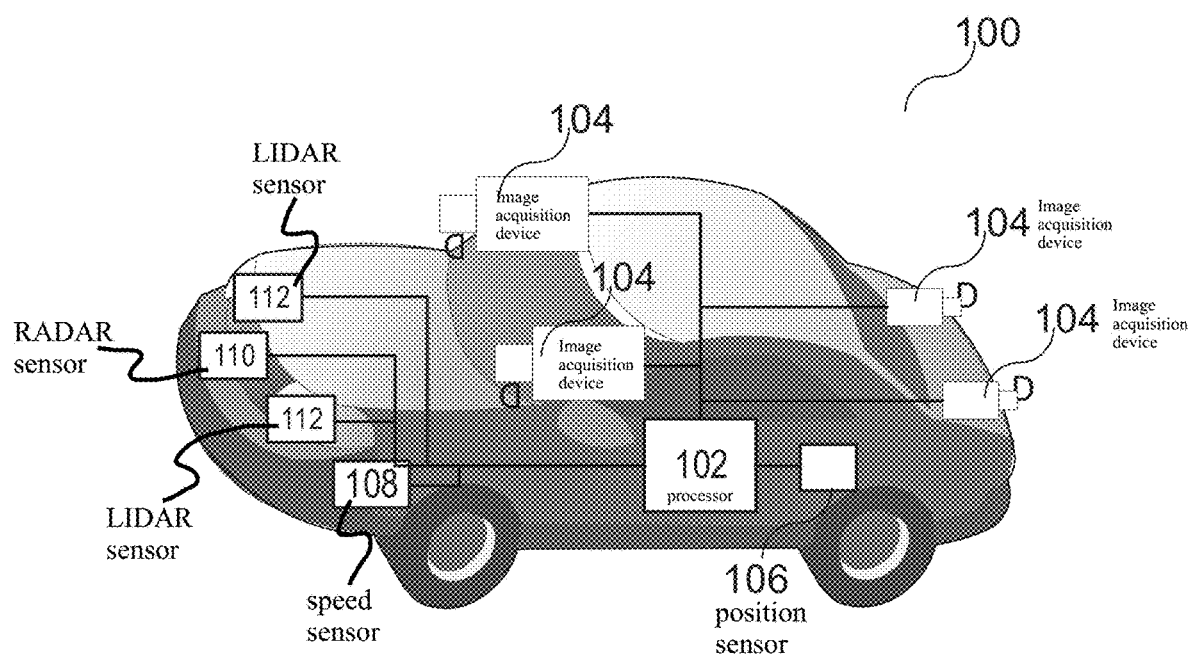
FIG. 1 shows an exemplary autonomous vehicle in accordance with various aspects of the present disclosure.

The following detailed description refers to the accompanying drawings that show, by way of illustration, exemplary details and aspects in which aspects of the present disclosure may be practiced.

The word "exemplary" is used herein to mean "serving as an example, instance, or illustration". Any aspect of the disclosure or design described herein as "exemplary" is not necessarily to be construed as preferred or advantageous over other aspects of the disclosure or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as radiofrequency (RF) transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, as described above, which is configured to traverse the ground, e.g., on a street, on a road, on a track, on one or more rails, off-road, etc.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects of the disclosure herein may utilize one or more machine learning models to perform or control functions of the vehicle (or other functions described herein). The term "model" may, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

FIG. 1 shows an exemplary vehicle, namely vehicle 100, in accordance with various aspects of the present disclosure. In some aspects, vehicle 100 may include one or more processors 102, one or more image acquisition devices 104, one or more position sensors 106, one or more speed sensors 108, one or more radar sensors 110, and/or one or more LIDAR sensors 112.

In some aspects, vehicle 100 may include a safety system 200 (as described with respect to FIG. 2 below). It is appreciated that vehicle 100 and safety system 200 are exemplary in nature and may thus be simplified for explanatory purposes. Locations of elements and relational distances (as discussed above, the figures are not to scale) are provided as examples and are not limited thereto. The safety system 200 may include various components depending on the requirements of a particular implementation.

Figure 2:
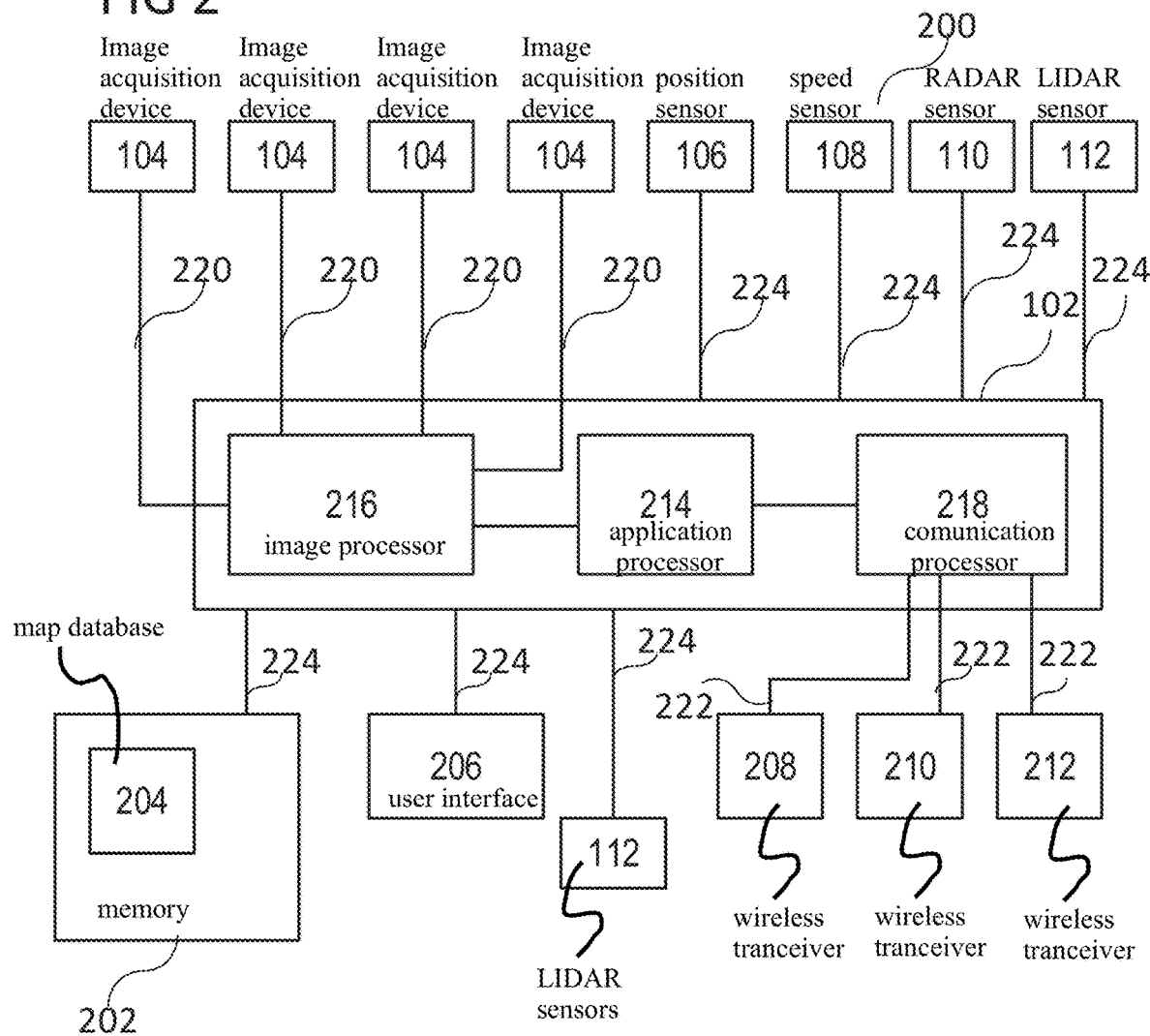
FIG. 2 shows various exemplary electronic components of a safety system of the vehicle in accordance with various aspects of the present disclosure.

FIG. 2 shows various exemplary electronic components of a vehicle, namely safety system 200, in accordance with various aspects of the present disclosure. In some aspects, the safety system 200 may include one or more processors 102, one or more image acquisition devices 104 (e.g., one or more cameras), one or more position sensors 106 (e.g., a Global Navigation Satellite System (GNSS), a Global Positioning System (GPS), among others) one or more speed sensors 108, one or more radar sensors 110, and/or one or more LIDAR sensors 112. According to at least one aspect, safety system 200 may further include one or more memories 202, one or more map databases 204, one or more user interfaces 206 (e.g., a display, a touch screen, a microphone, a loudspeaker, one or more buttons and/or switches, etc.), and/or one or more wireless transceivers 208, 210, 212. The wireless transceivers 208, 210, 212 may, in some aspects, be configured according to the same, different, or any combination thereof radio communication protocols or standards. By way of example, a wireless transceiver (e.g., a first wireless transceiver 208) may be configured in accordance with a Short Range mobile radio communication standard (e.g., Bluetooth, Zigbee, among others). As another example, a wireless transceiver (e.g., a second wireless transceiver 210) may be configured in accordance with a Medium or Wide Range mobile radio communication standard (e.g., 3G (e.g. Universal Mobile Telecommunications System—UMTS), 4G (e.g. Long Term Evolution—LTE), and/or 5G mobile radio communication standard in accordance with corresponding 3GPP ($3^{rd}$ Generation Partnership Project) standards, among others). As a further example, a wireless transceiver (e.g., a third wireless transceiver 212) may be configured in accordance with a Wireless Local Area Network communication protocol or standard (e.g., IEEE 802.11, 802.11, 802.11a, 802.11b, 802.11g, 802.11n, 802.11p, 802.11-12, 802.11ac, 802.11ad, 802.11ah, among others). The one or more wireless transceivers 208, 210, 212 may be configured to transmit signals an via antenna system over an air interface.

In some aspect, the one or more processors 102 may include an application processor 214, an image processor 216, a communication processor 218, and/or any other suitable processing device. Image acquisition device(s) 104 may include any number of image acquisition devices and components depending on the requirements of a particular application. Image acquisition devices 104 may include one or more image capture devices (e.g., cameras, CCDs (charge coupling devices), or any other type of image sensor).

In at least one aspect, the safety system 200 may also include a data interface communicatively connecting the one or more processors 102 to the one or more image acquisition devices 104. For example, a first data interface may include any wired and/or wireless first link 220 or first links 220 configured to transmit image data acquired by the one or more image acquisition devices 104 to the one or more processors 102 (e.g., to the image processor 216).

The wireless transceivers 208, 210, 212 may, in some aspects, be coupled to the one or more processors 102 (e.g., to the communication processor 218) via, for example a second data interface. The second data interface may include any wired and/or wireless second link 222 or second links 222 configured to transmit radio transmitted data acquired by wireless transceivers 208, 210, 212 to the one or more processors 102, e.g., to the communication processor 218.

In some aspects, the memories 202 as well as the one or more user interfaces 206 may be coupled to each of the one or more processors 102, e.g., via a third data interface. The third data interface may include any wired and/or wireless third link 224 or third links 224. Furthermore, the position sensor 106 may be coupled to each of the one or more processors 102, e.g., via the third data interface.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g., by the one or more processors 102), controls the operation of the system, e.g., the safety system. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

In some aspects, the safety system 200 may further include components such as a speed sensor 108 (e.g., a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), and the like. The radar sensors 110 and/or the LIDAR sensors 112 may be configured to provide pre-processed sensor data, such as radar target lists or LIDAR target lists. The third data interface may couple the speed sensor 108, the one or more radar sensors 110 and the one or more LIDAR sensors 112 to at least one of the one or more processors 102.

The one or more memories 202 may store data, e.g., in a database or in any different format, that, e.g., indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

Furthermore, the safety system 200 may include a driving model, e.g., implemented in an advanced driving assistance system (ADAS) and/or a driving assistance and automated driving system. By way of example, the safety system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving (ground) vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the safety system 200 as also described with reference to FIG. 2.

The vehicle 100 may include the one or more processors 102 e.g. integrated with or separate from an engine control unit (ECU) of the vehicle 100.

The safety system 200 may in general generate data to control or assist to control the ECU and/or other components of the vehicle 100 to directly or indirectly control the driving of the vehicle 100.

Figure 3:
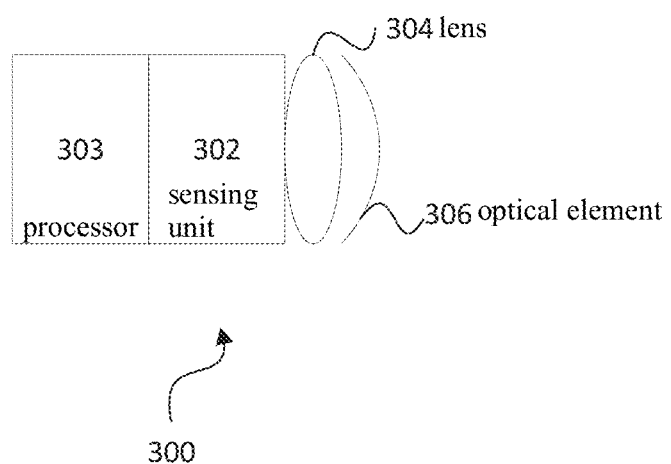
FIG. 3 depicts sensor damage/degradation, according to an aspect of the disclosure.

FIG. 3 depicts an example of sensor damage/degradation, according to an aspect of the disclosure. Embedded systems in autonomous vehicle operations may rely on one or more sensors to output sensor data for use in one or more perception operations. In FIG. 3, a sensor 300 is configured exemplarily as an image sensor, although this configuration is intended as an example, and the principles and methods disclosed herein may be implemented with a variety of other sensor types, as will be discussed in greater detail. The sensor 300 includes a sensing unit 302 and may be configured to receive electromagnetic radiation and to convert the electromagnetic radiation to current and/or voltage. Examples of such sensing units include, but are not limited to, charge-coupled devices (CCDs) and/or active-pixel sensors (CMOSs). The sensing unit 302 may output current and/or voltage. The sensing unit 302 may be connected to one or more processors 303, which may receive the outputted current and/or voltage and may interpret the sensing unit 302 output, such as by interpreting the outputted voltage and/or current as representing one or more pixels, the pixels forming an image. Image sensors 303 may include one or more lenses 304, which may be transparent devices, configured to change an angle of propagation and/or polarization of one or more electromagnetic waves. Image sensors may optionally include one or more optical elements 306, which may include one or more transparent surfaces though which electromagnetic radiation travels before reaching a lens. According to an aspect of the disclosure, the optional optical element may be configured as a wind screen or a shield. The one or more optional optical elements 306 may protect the lens from dirt, debris, and/or mechanical damage.

Several factors may individually or in combination with one another change the output of the sensor 300. The one or more lenses 304 and/or the one or more optional optical elements 306 may be subject to mechanical damage, such as scratching, chipping, or otherwise. The one or more lenses 304 and/or the one or more optional optical elements 306 may become partially covered with dirt and/or debris, which may impair their data detection. The one or more lenses 304 and/or the one or more optional optical elements 306 may exhibit aging, such as yellowing and the like. Additionally or alternatively, the sensing unit 302 may, due to aging (e.g. additional sensor noise, dead pixels, changed output values) and/or mechanical damage, output changed current and/or voltage values compared to a new sensing unit 302. Any of the above damage and/or aging considerations may change the sensor, compared to a new sensor.

As described above, sensor degradation, sensor damage, sensor aging, and the like may change input data for embedded systems compared to the input data available for the embedded system at the time of training or verification. Otherwise stated, embedded systems may be trained and/or verified using relatively new sensors; however, over time, the sensor data output by said sensors may change (e.g. due to sensor aging, sensor damage, etc.). In some circumstances, it may be possible to perform various local adaptation and/or retraining procedures to compensate for some of these effects. These local adaptation and/or retraining procedures may significantly increase the lifetime of the corresponding device and decrease the service intensity.

However, after local re-training of the system, the system is unlikely to perform according to the original specifications. This may be particularly relevant in safety sensitive applications. Moreover, such embedded systems are often verified using complex computational resources that may only be available externally to the embedded system or its device. Thus, there exists a need to compensate for sensor degradation, and to re-verify a compensated/retrained embedded system.

According to an aspect of the disclosure, an approach to separate effects of a temporal alteration to the embedded system is described. This approach may permit testing and validation of the system. This approach may utilize synthetic data generation with an updated sensor model to overcome and compensate for differences between the original sensor data used for training and validation and the current sensor, which may exhibit altered characteristics. The insertion of a sensor model may allow the re-validation of the system with a defined scenario catalogue and may therefore preserve requirements for original specification and of certification. Further, the embedded system may be equipped with a monitoring setup, which may determine whether the embedded system is working properly.

When embedded system problems are detected, such as when sensors are damaged or degraded, it may be necessary under current conventions to shut down centrally-trained embedded systems, until such time that the problem can be remediated and/or the embedded system can be re-verified. Such a shutdown of one embedded component is further likely to affect the entire system, which may reduce overall safety of the system, should the system be permitted to continue to operate. Herein are described techniques and procedures for re-training and re-validation of an embedded system. Such re-training and re-validation may reduce service costs, reduce system down times, and increase safety.

This disclosure includes strategies and techniques to improve an ability of an embedded system with sensor-based perception function to adapt to alterations of the sensors (e.g. due to sensor aging, sensor damage, etc.). These strategies and techniques may generally include combinations of mathematical modelling and separation of the temporal altered system functions; procedures to detect and estimate these alterations using the resulting model; generation of synthetic data based on the detection and alternation of these features; local re-training and re-validation of the of the system using the synthetic data; and updated monitoring based on the alteration model. According to an aspect of the disclosure, the principles and methods described herein may improve functionality of sensor-reliant devices, such as perception devices and AI. According to another aspect of the disclosure, the principles and methods disclosed herein may permit re-verification (e.g. including local or on-site re-verification) of the embedded system.

Figure 4:
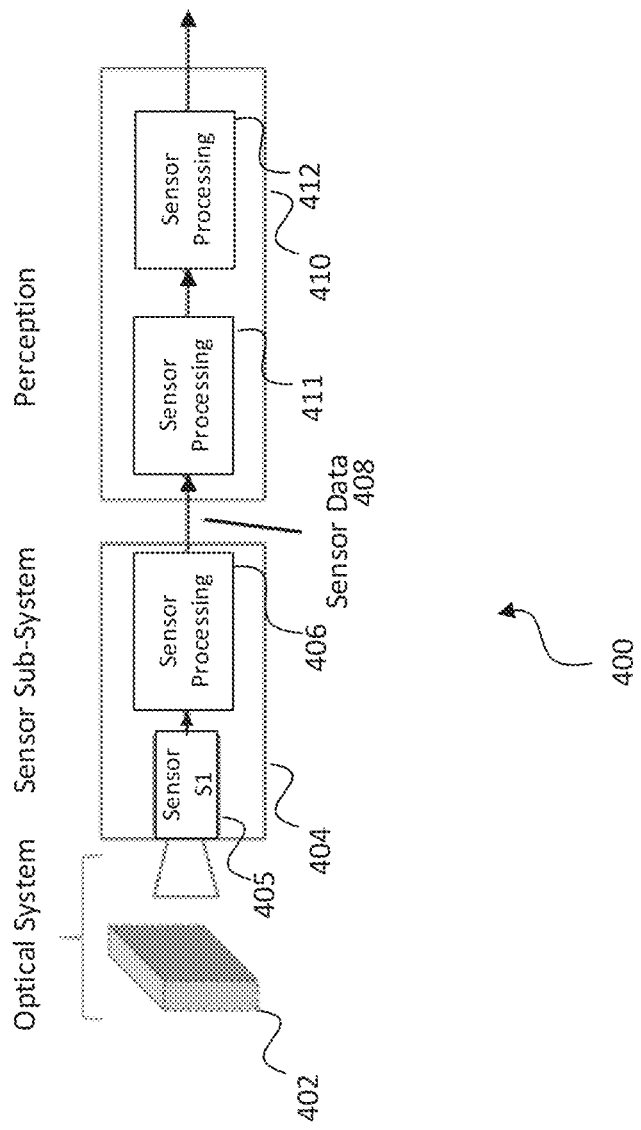
FIG. 4 shows the components and signal flow of an embedded perception system, according to an aspect of the disclosure.

FIG. 4 shows the components and signal flow of an embedded perception system 400, according to an aspect of the disclosure. The embedded perception system may include an optical system 402, a sensor sub-system 404, sensor data 408, and/or perception stages 410. The optical system may include one or more lenses and/or one or more optional optical elements, such as a cover or a wind screen. Sensors are usually rigidly connected to these optional optical elements and therefore, the optional optical elements are generally assumed to be part of the optical system. Although this configuration is used herein for convenience, other configurations in which the optional optical element is not part of the optical system should not be excluded. Scratches or dirt in the optical path may reduce the sensor performance, and thus the system performance. Alternatively or additionally, sensors may experience sensor aging, which may negatively affect the quality of the sensor data, such as by decreasing sensor sensitivity, increasing sensor noise, etc.

Electromagnetic waves may pass through the optical system and into/onto the sensor 405, which may convert the electromagnetic waves into voltage and/or current. The sensor may include a plurality of regions (e.g. such as regions corresponding to a plurality of pixels) which each correspond to one or more separate voltages and/or currents. The sensor may be electrically connected to the sensor processing unit 406, such that the sensor processing unit 406 may receive the one or more voltages and/or currents. The sensor processing unit 406 may convert these one or more voltages and/or currents to image data.

The sensor subsystem 404 may process these data. One or more components of the sensor subsystem 404 may send the sensor data to the perception unit 410. The perception unit 410 may include a sensor processing unit 411 and a sensor processing unit 412. The sensor processing units 411 and 412 may perform one or more perception operations on the sensor data. Such perception operations may include, but are not limited to, recognizing an object within the sensor data, determining a distance of an object within the sensor data, determining a velocity or an acceleration of the object within the sensor data, determining a criticality of the object relative to a vehicle, etc.

As described above, one or more aspects of the optical system may degrade with time (e.g. through aging, scratches, dirt, debris, or otherwise). One or more devices and/or procedures may detect such degradation. For example, a vehicle may employ principles of computer vision to test whether a camera is still calibrated. For example, in the event of a scratch, or of debris or dirt on a lens, the sensor data would be expected to include one or more pixels of a fixed color and/or brightness, or to otherwise exhibit an identifiable change in its sensor data output related to the affected sensor areas. For example, a cluster of pixels may remain dark. Although a cluster of dark pixels in any individual frame may not suggest optical system degradation, in the absence of optical system degradation, the system may expect a cluster of dark pixels to move, such as when the vehicle turns. If the cluster of dark pixels remains stationary, even when the vehicle turns or rotates, this may be an indication that the dark pixels are result of debris on, or damage to, the optical system. Similarly, aging may render one or more lenses as having decreased transparency/greater translucency or opacity. Aging may alter a color of one or more lenses and/or one or more optional optical elements. Sensor degradation may result in additional sensor noise, changed sensor color output, reduced sensitivity, dead pixels, or otherwise. One or more processors may be programmed to recognize changes in opacity, translucency, transparency, and/or color that may be indicative of aging of the optical system. The examples of computer-detection of optical system degradation are provided for demonstrative purposes and are not intended to be limiting.

An example of how an altered optical set-up can be retrieved is by dynamic calibration, which is a technique that is able to retrieve the projective camera parameters. Similarly, various techniques can be used to detect color aberrations by analysis of image statistics or observation of scene points over time, etc. Such techniques may provide an updated estimated sensor model.

If one or more processors (e.g. one or more processors of a monitoring system) detect degradation of the optical system, the one or more processors may reconfigure one or more aspects of the embedded system. This may include adaptation or re-training of the system; estimation of system alteration; re-validation; or otherwise.

Figure 5:
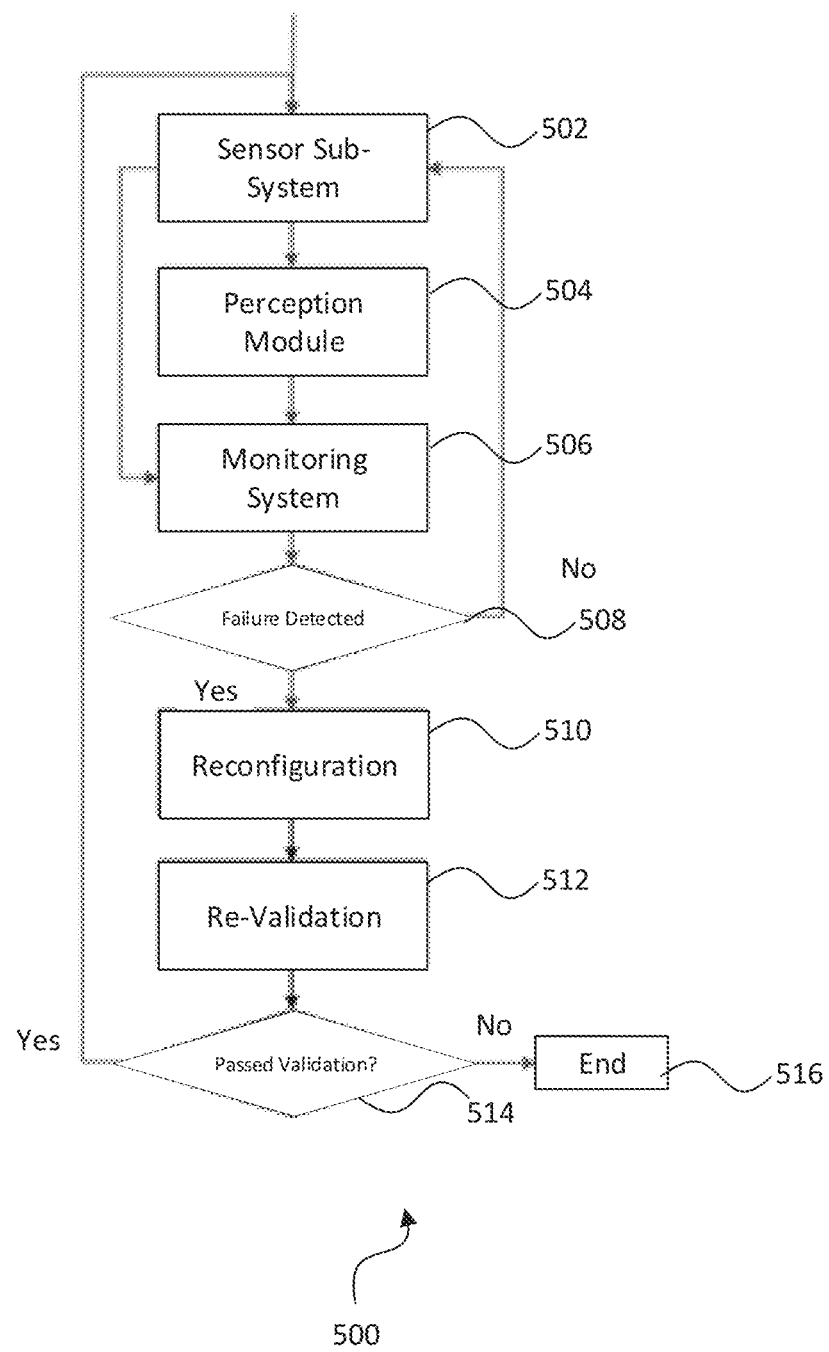
FIG. 5 depicts a sensor data evaluation system according to an aspect of the disclosure.

FIG. 5 depicts a sensor data evaluation system 500 according to an aspect of the disclosure. In this system, the sensor sub-system 502 may include one or more sensors and optionally one or more corresponding sensor optical systems. As described above, the sensor system may detect information (e.g. such as around a vicinity of a vehicle) and output sensor data representing the detected information. The perception module 504 may receive the outputted data from the sensor sub-module 502 and perform one or more perception operations. These perception operations may include, but are not limited to, detection of an object within the sensor data and/or detection of one or more object attributes (e.g. velocity, acceleration, distance, criticality, etc.). The perception module 504 may output object information and/or object attribute information to the monitoring system 506. Alternatively or additionally, the monitoring system 506 may receive sensor output data from the sensor subsystem 502. Alternatively or additionally, the monitoring system may receive sensor output data from the perception module 504. The monitoring system 506 may be configured to detect a sensor deficiency (e.g. such as due to a damaged, dirty, and/or aged sensor optical system; sensor aging, damaged sensor, or otherwise). The monitoring system 506 may include one or more processors, which may be configured to analyze sensor output data and/or perception module output information to detect a sensor deficiency.

According to one aspect of the disclosure, the monitoring system may be configured to declare a sensor failure for each detected sensor deficiency. According to another aspect of the disclosure, the monitoring system may be configured to evaluate a significance of a detected sensor deficiency, such that a magnitude of sensor error or sensor deficiency must be determined for a sensor failure to be declared. In this manner, the monitoring system 506 may be configured not to declare a sensor failure for each and every sensor deficiency detected, but rather only for sensor deficiencies that exceed a predetermined threshold, that are outside of a predetermined range, or otherwise exhibit a sufficient magnitude of sensor deficiency.

Upon detecting a sensor deficiency of sufficient magnitude, the system may declare a failure 508. The failure may be noted or detected in the monitoring system 506, or in any one or more processors described herein. Any one or more processors as described herein may be configured to send a signal representing the detected failure to one or more other processors. The sending of said signal may be achieved via any wired or wireless method.

As depicted herein, if no failure is detected, outputs of the sensor subsystem 502 and or the perception module 504 may again be evaluated to detect a sensor deficiency. In this manner, constant, frequent, periodic or otherwise assessment of the sensor subsystem 502 may be achieved, decreasing a delay of sensor deficiency detection and/or increasing the rapidity with which a sensor deficiency is detected.

If a sensor deficiency is detected, one or more processors may initiate a sensor reconfiguration 510. The reconfiguration 510 may include re-training or other adaptive steps to compensate for the temporal aberration (e.g. sensor deficiency) and estimating and updating the system characteristics. These will be described in greater detail.

Following reconfiguration 510, the system may perform revalidation 512. The revalidation 512 may include, generating from a first testing data output a second testing data output, wherein the second testing data are based on the sensor deficiency information, and wherein the second testing data are different from the first testing data. That is, first testing data representing sensor output of one or more working (e.g. non-deficient and/or new and/or ideal) sensors may be modified by a determined sensor deficiency to reflect sensor output data that a sensor with the determined deficiency (or deficiencies) would output if given the same sensor input as was used in the first testing data. This may be performed, for example, by an artificial neural network. One or more processors may be configured to determine a difference between the first testing data output and the second testing data output; and if the difference between the first testing data output and the second testing data output is outside of one or more predetermined ranges or does not satisfy one or more predetermined criteria, the one or more processors may be configured to send a signal representing a result of the determined difference. According to an aspect of the disclosure, if the result is within a predetermined range, then the one or more processors may consider the one or more sensors with the sensor deficit to have been revalidated (e.g. passed evaluation) 514. According to another aspect of the disclosure, the system may be so configured that revalidation occurs when the result is outside of the predetermined range. As described above, the one or more working sensors represent one or more sensors that do not exhibit the sensor deficiency. This may be, for example, a new and/or fully-operational sensor. Additionally or alternatively, this may be understood as an ideal or a perfectly-functioning sensor. In portions of this disclosure, the one or more working sensors may be referred to as one or more first sensors. Similarly, the one or more sensors exhibiting a sensor deficiency may be referred to as one or more second sensors.

If the validation is successful, the process may begin anew, and the one or more processors may receive and assess sensor data as described in 506 herein. If the validation is unsuccessful, the process may end 516, and the one or more processors may implement one or more safety actions. For example, if the validation is unsuccessful, the one or more processors may send an instruction to stop the vehicle until the necessary maintenance and/or repair may be performed.

According to an aspect of the disclosure, the re-training may only involve the first stage of the perception system as shown in FIG. 4, element 411. The system may perform the retraining using one or more machine learning techniques. According to an aspect of the disclosure, and unsupervised machine learning technique may be used.

According to an aspect of the disclosure, one or more processors may perform retraining locally on the device. For example, in the event that the sensor validation procedures as described herein are performed with respect to an autonomous vehicle, one or more processors located locally within the vehicle may perform retraining procedures as described herein. Although this may be used in any configuration, this may be particularly desirable in situations in which transmission and/or communication with other devices is limited, such as in times of limited reception, limited bandwidth, or otherwise. Alternatively or additionally, it may be beneficial to perform retraining locally in circumstances in which continued operation of the device is desirable. For example, in the context of an autonomous vehicle, it may be desirable to perform retraining so that the vehicle can again be available for operation as soon as possible, rather than requiring transportation of the vehicle to a remote location for retraining.

Alternatively, and according to another aspect of the disclosure, one or more remotely located processors (e.g., not in the vehicle) may perform retraining. This may be performed by connecting the vehicle to one or more remote stations (e.g. in a repair shop), and/or by performing the retraining using one or more edge services or cloud servers, to which sensor degradation information and/or second testing data are transmitted.

Figure 6:
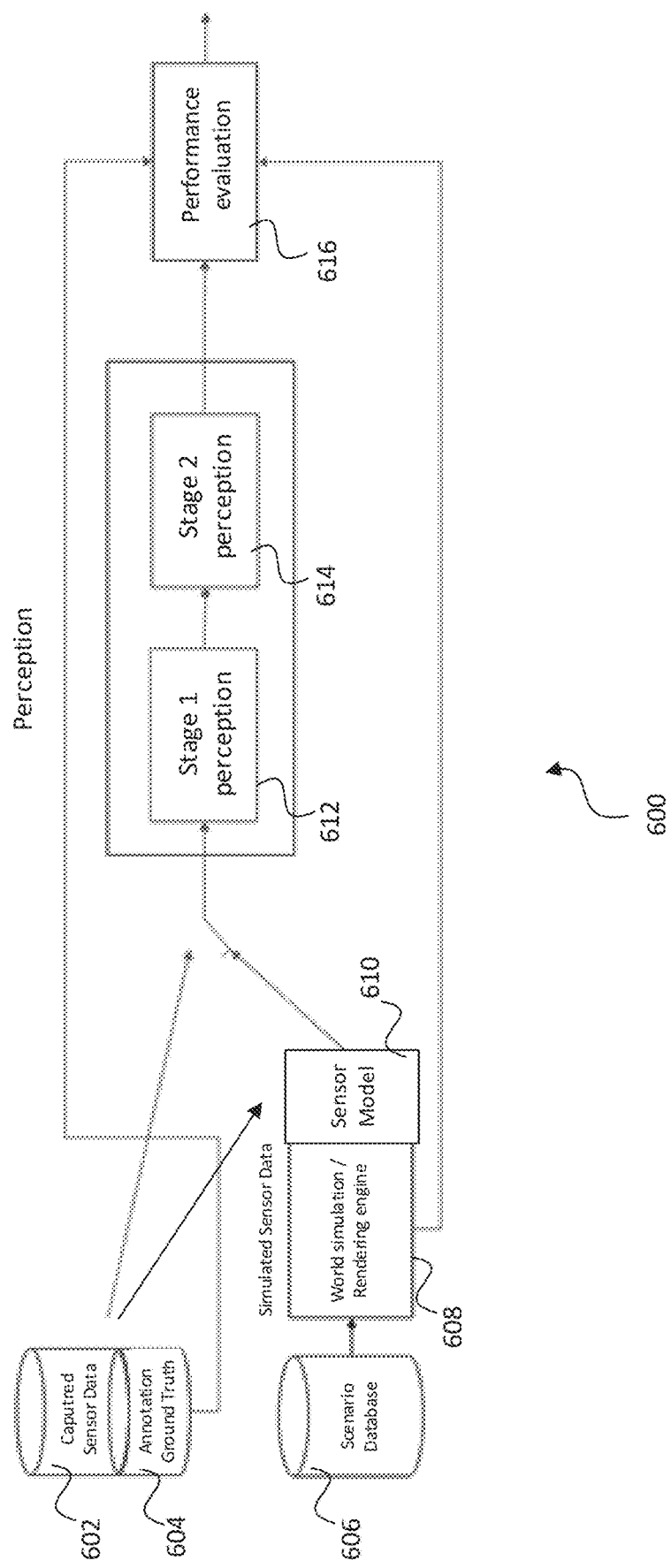
FIG. 6 depicts a system revalidation according to an aspect of the disclosure.

FIG. 6 depicts a system revalidation 600 according to an aspect of the disclosure. The system may include captured sensor data 602, which may be sensor data outputted from one or more sensors. Said sensor data may, illustratively, correspond to sensor data detected from sensor input representing a vicinity of a vehicle. One or more processors may assess the sensor data relative to an annotation ground truth 604 to discover one or more sensor deficiencies. Sensor deficiencies may include, for example, sensor faults (e.g. pixel faults and sensor degeneration). The one or more processors may detect/estimate alterations arising from detected sensor deficiencies by assuming continuity of scene parameters. For example, if a sensor rotation is detected, then scene points can be tracked over time. As a scene moves from an operational pixel to a defective (e.g. non-operational) pixel, the degradation can be estimated. The one or more processors may also estimate alterations of the optical path (e.g. scratches, lens damage, optional optical element damage, etc.) with this principle.

The one or more processors may apply these determined alterations to one or more scenarios, such as within the scenario database 606. The system may include a scenario database 606, which may include one or more verification scenarios. Such scenarios may include sensor data input for validation. The one or more processors may utilize one or more computer graphic methods or other sensor simulation techniques to characterize the sensor input. The one or more processors may modify the sensor input to accommodate a plurality of different sensors, including, but not limited to, image sensors, radar sensors, audio sensors, and otherwise. The sensor input may be stored locally (e.g. in the vehicle), on a cloud server, in an external facility, or otherwise.

The system may include a world simulation/rendering engine 608, which may be configured to render sensor data output corresponding to output from a first sensor (e.g. a new sensor, a sensor-deficiency-free sensor, or a working sensor) receiving the sensor input from one or more scenarios of the scenario database 606. In this manner, the sensor data from the world simulation/rendering engine 608 may represent sensor data as would be outputted by a new or deficit-free sensor receiving the sensor verification input.

The system may further include a sensor modeling engine 610, which may be configured to model sensor data output from a sensor including a detected sensor defect (e.g. a second sensor). As stated above, the elements 602 and 604 may detect one or more sensor-detriments within one or more sensors of the system. The sensor detriments may be communicated to the sensor model 610, which may then create a simulation using a scenario from the scenario database 606, as it would have been detected from a sensor exhibiting the detected sensor defect. In this manner, sensor input data from the scenario database 606 may be received by the sensor model 610 and from said data, the sensor model 610 may output sensor data output reflecting detected sensor data from a hypothetical sensor having the determined sensor deficit. In this manner, two models become available for comparison: a first model representing a perfect sensor's sensor data as interpreting a scenario from the scenario database 606; and sensor data of a hypothetical sensor having the detected sensor detriment of the second sensor, as interpreting a scenario from the scenario database 606.

As described herein, the update sensor model can be used in data synthesis to simulate the estimated alterations. This may allow the system to re-validate itself to the same scenario database as used in the original validation. Perception functions are conventionally trained with real data. When training occurs using supervised methods, this is typically performed with annotated ground truth data. Since such annotated ground truth data are data usually captured with a new, i.e. un-altered sensor, the captured data reflect an ideal case and does not necessarily produce realistic results in performance evaluations of the perception function after the re-training on the altered sensor. As such, the system may use synthetically generated data that is generated based on an updated sensor model from the re-configuration stage. This may enforce that the original synthetic test data are adapted to the changed sensor conditions and give a more meaningful validation of the altered and re-trained perception module.

The one or more processors may be configured to model these alterations as pixel alterations on a matrix, such that each pixel corresponds to a matrix entry. In this manner, the one or more processors may mask out 'dead pixels'. Alternatively or additionally, the one or more processors may be configured to model similar degradations by a function, including noise and altered value mapping.

It is noted that the perception engine as depicted herein is divided into stage I perception 612 and stage II perception 614. This may represent a conventional division in which stage I perception 612 represents rapid calculations to extract low-level properties of a visual scene, and wherein stage II perception 614 includes pattern perception and object recognition. The principles and methods described herein may be performed within this two-stage system, or within systems of other numbers or configurations of stages. To the extent that this two-stage system is used, the system may optionally be configured such that the sensor evaluation may be performed, if it all, within stage II, relative to object and/or pattern recognition. The principles and methods disclosed herein may allow for the system to perform sensor evaluation within stage I 612. Alternatively, the sensor evaluation may be performed in any other element having access to both models for comparison.

A performance evaluation module 616 may evaluate the results of the model comparison. In comparing the sensor data output from the world simulation rendering engine 608 (e.g. first testing data), and the sensor data output from the sensor model 610 (e.g. second testing data), the performance evaluation module 616 may determine a magnitude of difference between these sets. The comparison may yield a magnitude of difference between the sensor data representing detected first sensor data and the sensor data resulting from the detected sensor detriment of the second sensor, and if this difference is outside of a predetermined threshold, the one or more processors may detect a failure. If the difference is within the predetermined threshold, the one or more processors may deem the sensor deficit acceptable, and the one or more processors may consider the system revalidated.

According to an aspect of the disclosure, the system may include a generative adversarial network (GAN) technique to compensate for one or more determined sensor deficiencies. In this manner, the one or more processors may utilize one or more GAN techniques for sensor output data corresponding to a sensor with a determined sensor deficiency. One or more processors using the GAN technique may receive the sensor output data of the sensor with the determined sensor deficiency and may output GAN-restored sensor data, representing an approximation of sensor output data for a sensor not having the determined sensor deficiency.

According to an aspect of the disclosure, the one or more validation scenarios may be stored in a scenario database and/or scenario library. These validation scenarios may provide the sensor input for the validation. The one or more processors may be configured to provide the scenarios to the sensors by means of rendering, such as using computer graphics or other sensor simulation techniques, e.g. for radar, audio and other. According to an aspect of the disclosure, the system may include one or more screens on which the scenario is depicted/displayed. The one or more image sensors may be configured to detect sensor information from the one or more screens and to output sensor data representing the detected scenario. This technique can be adjusted to accommodate a variety of sensors, such as radar, audio, or otherwise.

FIG. 7 depicts a sensor data evaluation device 700, including an artificial neural network 702, including an input layer 703 and an output layer 704, wherein the artificial neural network 702 is configured to receive first testing data in the input layer 703, process the first testing data, and output from the output layer 704 a first testing data output, wherein the first testing data represent sensor data of a working sensor (e.g. data detected by the first sensor) detecting a sensor input; and one or more processors 706, configured to receive sensor deficiency information representing a deficiency of a second sensor; generate second testing data, wherein the second testing data are based on the sensor deficiency information, and wherein the second testing data are different from the first testing data; implement the artificial neural network 702 to receive the second testing data in the input layer 703, process the second testing data; and output from the output layer 704 a second testing data output; determine a difference between the first testing data output and the second testing data output; and if the difference between the first testing data output and the second testing data output is outside of one or more predetermined ranges or does not satisfy one or more predetermined criteria, send a signal representing a result of the determined difference.

Figure 8:
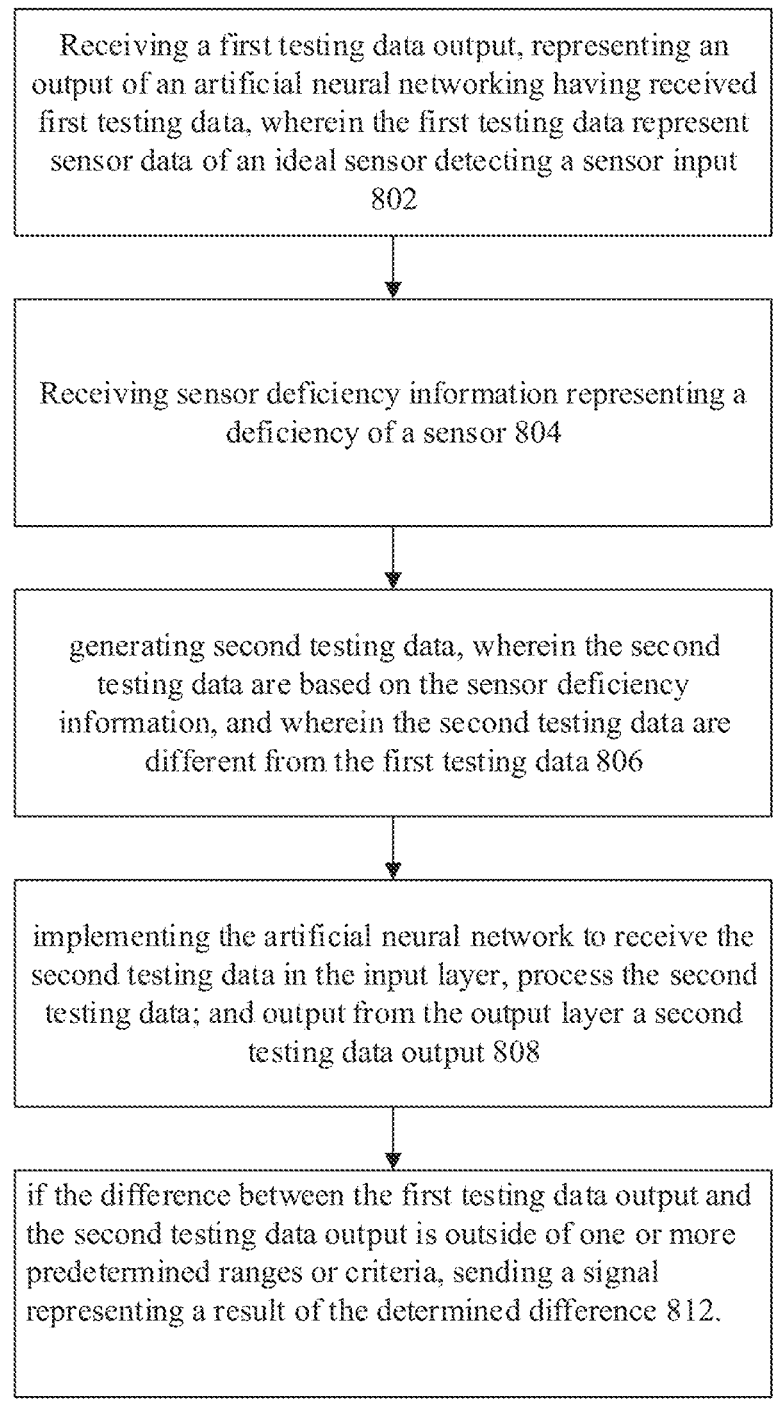
FIG. 8 depicts a method of sensor data evaluation.

FIG. 8 depicts a method of sensor data evaluation, including receiving a first testing data output, representing an output of an artificial neural networking having received first testing data, wherein the first testing data represent sensor data of a working sensor (e.g. the first sensor) detecting a sensor input 802; receiving sensor deficiency information representing a deficiency of a sensor 804; generating second testing data, wherein the second testing data are based on the sensor deficiency information, and wherein the second testing data are different from the first testing data 806; implementing the artificial neural network to receive the second testing data in the input layer, process the second testing data; and output from the output layer a second testing data output 808; determining a difference between the first testing data output and the second testing data output 810; and if the difference between the first testing data output and the second testing data output is outside of one or more predetermined ranges or does not satisfy one or more predetermined criteria, sending a signal representing a result of the determined difference 812.

The second testing data as described herein may represent a modification of the first testing data by the detected sensor deficiency information, so as to reflect sensor input (e.g. from the scenario database) as would be detected by a sensor with a determined sensor deficiency. In this manner, the one or more processors may approximate sensor output of a sensor having the determined sensor deficiency in a standardized format, such that it may be readily comparable with validation data as sensor output data corresponding to a scenario within the scenario database.

Differences between the first testing data and the second testing data may be characterized in any manner desired. According to an aspect of the disclosure, a difference between the first testing data output and second testing data output may be a numerical difference, a statistical difference, probabilistic difference, a difference according to one or more rules, a difference according to one or more relationships, or any combination thereof.

Once determined, one or more processors (e.g. the performance evaluation module 616) may determine a magnitude of difference between the first testing data and the second testing data, and if the magnitude of difference between the first testing data and the second testing data is outside of a predetermined threshold, one or more processors may be configured to send a signal representing an instruction to a vehicle to stop operation. In this manner, it can be assured that the vehicle is not permitted to operate unsafely due to a defective sensor/sensor detriment.

Alternatively or additionally, one or more processors (e.g. the performance evaluation module 616) may be configured to send a signal representing a sensor validation, if the difference between the first testing data output and the second testing data output is within the one or more predetermined ranges or satisfies one or more predetermined criteria. In this manner, it may be confirmed that a detected sensor detriment insufficiently impairs the sensor output data so as to warrant disabling the vehicle or otherwise discontinuing service. This provides a mechanism to evaluate a significant source of verity of a sensor detriment and to make a determination about the need to discontinue vehicle use such that the sensor detriment may be repaired or remediated.

The sensor detriment may include any condition that diminishes a quality or accuracy of sensor data. Without limitation, the sensor detriment may include mechanical damage to a sensor, mechanical damage to a sensor cover, one or more opaque obstructions in an optical path of a sensor, a reduction of sensor data quality due to sensor aging, or any combination thereof.

According to an aspect of the disclosure, one or more processors may be configured to disregard sensor output data of a sensor having a sensor detriment for which the difference between the first testing data and second testing data was outside of the predetermined range. In autonomous vehicles, it is known to utilize sensor redundancy, in which multiple similar or identical sensors are used to test one another or as backups to one another, in the event of sensor failure. Should a sensor detriment be detected, and should the difference between the second testing data corresponding to the sensor detriment and the first testing data be outside of the predetermined range, one or more processors may be configured to disregard or ignore sensor output data from the sensor, and thus rely on sensor output from one or more redundant sensors.

Alternatively or additionally, if a sensor detriment involves a limited portion of the sensor data (e.g. a limited number of damaged or dead pixels and/or a limited area of one or more lenses and/or one or more optional optical elements), the one or more processors may be configured to ignore or disregard sensor data corresponding to the limited portion (e.g. corresponding to the limited number of damaged or dead pixels). In this manner, the one or more processors may improve a quality of the data set by disregarding or ignoring sensor data with a high likelihood of inaccuracy. According to another aspect of the disclosure, the one or more processors may create third testing data, the third testing data representing sensor data output from a sensor exhibiting the sensor deficit and receiving sensor input as a scenario from the scenario database, from which sensor data output corresponding to the limited portion of sensor data is disregarded or ignored. For example, in the event that a dead pixel is detected, third testing data may be the second testing data from which data corresponding to the dead pixel has been deleted, masked, or otherwise. In this manner, the one or more processors may be configured to determine revised sensor deficiency information, representing a deficiency of the sensor in which the sensor information detected by the one or more pixels is disregarded; generate third testing data, the third testing data representing a modification of the first testing data by the revised sensor deficiency information in which the sensor information detected by the one or more pixels is disregarded; implement the artificial neural network to receive the third testing data in the input layer, process the third testing data; and output from the output layer a third testing data output; determine a difference between the first testing data output and the third testing data output; and if the difference between the first testing data output and the third testing data output is outside of the one or more predetermined ranges or does not satisfy the one or more predetermined criteria, send a signal representing a result of the determined difference.

As described herein the sensors may be any kind of sensors without limitation. According to an aspect of the disclosure, the sensors may include one or more image sensors, one or more camera sensors, one or more Light Detection and Ranging (LIDAR) sensors, one or more radar sensors, one or more acoustic sensors, or any combination thereof.

According to another aspect of the disclosure, the system may further include an additional artificial neural network, including an input layer and an output layer, wherein the additional artificial neural network is configured to receive sensor data representing an environment as detected by the sensor, process the sensor data, and output from the output layer modified sensor data representing the sensor data as modified to compensate for the sensor deficiency. In this manner, the one or more processors may be further configured to implement the additional artificial neural network to receive modified sensor data in the input layer, process the modified sensor data, and output from the output layer a fourth testing data output; determine a difference between the first testing data output and the fourth testing data output; and if the difference between the first testing data output and the fourth testing data output is outside of the one or more predetermined ranges or does not satisfy the one or more predetermined criteria, send a signal representing a result of the determined difference.

According to an aspect of the disclosure, the additional artificial neural network is configured to process the sensor data according to a generative adversarial network technique.

According to an aspect of the disclosure, the predetermined range for comparison and/or verification purposes may include any degree of similarity desired for the given implementation. That is, verification may require the testing data output be identical, substantially identical, or similar within some quantifiable amount, such a calculated by a percent difference, one or more standard deviations, a statistical significance, or any other calculation desired.

According to an aspect of the disclosure, the one or more predetermined criteria may include similarity of driving decision, such that one or more processors operating the vehicle would elect the same set of actions based on the two sets of data, or that the one or more processors operating the vehicle would elect a set of actions whose safety is substantially comparable to actions that would be elected using data from a working sensor.

Additional aspects of the disclosure will be described below by way of example:

In Example 1, a sensor data evaluation device is disclosed, including an artificial neural network, including an input layer and an output layer, wherein the artificial neural network is configured to receive first testing data in the input layer, process the first testing data, and output from the output layer a first testing data output, wherein the first testing data represent sensor data of a working sensor (e.g. the first sensor) detecting a sensor input; and one or more processors, configured to: receive sensor deficiency information representing a deficiency of a sensor; generate second testing data, wherein the second testing data are based on the sensor deficiency information, and wherein the second testing data are different from the first testing data; implement the artificial neural network to receive the second testing data in the input layer, process the second testing data; and output from the output layer a second testing data output; determine a difference between the first testing data output and the second testing data output; and if the difference between the first testing data output and the second testing data output is outside of one or more predetermined ranges or does not satisfy one or more predetermined criteria, send a signal representing a result of the determined difference.

In Example 2, the sensor data evaluation device of example 1 is disclosed, wherein the second testing data represent a modification of the first testing data by the sensor deficiency information to reflect the sensor input as detected by a sensor with the sensor deficiency.

In Example 3, the sensor data evaluation device of example 1 or 2 is disclosed, wherein the difference between the first testing data output and second testing data output is a numerical difference, a statistical difference, probabilistic difference, a difference according to one or more rules, a difference according to one or more relationships, or any combination thereof.

In Example 4, the sensor data evaluation device of any one of examples 1 to 3 is disclosed, wherein the one or more processors are further configured to send a signal representing an instruction to a vehicle to stop operation if the determined difference is outside of the one or more predetermined ranges or does not satisfy the one or more predetermined criteria.

In Example 5, the sensor data evaluation device of any one of examples 1 to 4 is disclosed, wherein the one or more processors are further configured to send a signal representing a sensor validation if the difference between the first testing data output and the second testing data output is within the one or more predetermined ranges or satisfies the one or more predetermined criteria.

In Example 6, the sensor data evaluation device of any one of examples 1 to 5 is disclosed, wherein the sensor deficiency information includes information representing mechanical damage to a sensor, mechanical damage to a sensor cover, one or more opaque obstructions in an optical path of a sensor, a reduction of sensor data quality due to sensor aging, or any combination thereof.

In Example 7, the sensor data evaluation device of any one of examples 1 to 6 is disclosed, wherein if the difference between the first testing data output and the second testing data output is outside of the one or more predetermined ranges or does not satisfy the one or more predetermined criteria, the one or more processors are further configured to identify one or pixels corresponding to the difference and to disregard sensor information detected by the one or more pixels.

In Example 8, the sensor data evaluation device of example 7 is disclosed, wherein the one or more processors are further configured to: determine revised sensor deficiency information, representing a deficiency of the sensor in which the sensor information detected by the one or more pixels is disregarded; generate third testing data, the third testing data representing a modification of the first testing data by the revised sensor deficiency information in which the sensor information detected by the one or more pixels is disregarded; implement the artificial neural network to receive the third testing data in the input layer, process the third testing data; and output from the output layer a third testing data output; determine a difference between the first testing data output and the third testing data output; and if the difference between the first testing data output and the third testing data output is outside of the one or more predetermined ranges or does not satisfy the one or more predetermined criteria, send a signal representing a result of the determined difference.

In Example 9, the sensor data evaluation device of any one of examples 1 to 8 is disclosed, wherein the sensor is an image sensor, a camera sensor, a Light Detection and Ranging (LIDAR) sensor, a radar sensor, an acoustic sensor, or any combination thereof.

In Example 10, the sensor data evaluation device of any one of examples 1 to 9 is disclosed, wherein the one or more processors are further configured to determine the deficiency of the sensor.

In Example 11, the sensor data evaluation device of example 10 is disclosed, wherein the one or more processors are further configured to determine the deficiency of the sensor by determining a difference between actual sensor data of a pixel and expected sensor data of the pixel using at least two sensor data samples.

In Example 12, the sensor data evaluation device of any one of examples 1 to 11 is disclosed, further including an additional artificial neural network, including an input layer and an output layer is disclosed, wherein the additional artificial neural network is configured to receive sensor data representing an environment as detected by the sensor, process the sensor data, and output from the output layer modified sensor data representing the sensor data as modified to compensate for the sensor deficiency.

In Example 13, the sensor data evaluation device of example 12 is disclosed, wherein the one or more processors are further configured to: implement the additional artificial neural network to receive modified sensor data in the input layer, process the modified sensor data, and output from the output layer a fourth testing data output; determine a difference between the first testing data output and the fourth testing data output; and if the difference between the first testing data output and the fourth testing data output is outside of the one or more predetermined ranges or does not satisfy the one or more predetermined criteria, send a signal representing a result of the determined difference.

In Example 14, the sensor data evaluation device of example 13 is disclosed, wherein the additional artificial neural network is configured to process the sensor data according to a generative adversarial network technique.

In Example 15, the sensor data evaluation device of any one of examples 1 to 14 is disclosed, wherein the first testing data and/or the second testing data are simulator data.

In Example 16, a non-transitory computer readable medium is disclosed, including instructions which, when executed, cause one or more processors to: receive a first testing data output, representing an output of an artificial neural networking having received first testing data, wherein the first testing data represent sensor data of a working sensor (e.g. the first sensor) detecting a sensor input; receive sensor deficiency information representing a deficiency of a sensor; generate second testing data from the first testing data, wherein the second testing data are based on the sensor deficiency information, and wherein the second testing data are different from the first testing data; implement the artificial neural network to receive the second testing data, process the second testing data; and output a second testing data output; determine a difference between a first testing data output and the second testing data output; and if the difference between the first testing data output and the second testing data output is outside of one or more predetermined ranges or does not satisfy one or more predetermined criteria, send a signal representing a result of the determined difference.

In Example 17, the non-transitory computer readable medium of example 16 is disclosed, wherein the second testing data represent a modification of the first testing data by the sensor deficiency information to reflect the sensor input as detected by a sensor with the sensor deficiency.

In Example 18, the non-transitory computer readable medium of example 16 or 17 is disclosed, wherein the difference between the first testing data output and second testing data output is a numerical difference, a statistical difference, probabilistic difference, a difference according to one or more rules, a difference according to one or more relationships, or any combination thereof.

In Example 19, the non-transitory computer readable medium of any one of examples 16 to 18 is disclosed, wherein the instructions are further configured to cause the one or more processors to send a signal representing an instruction to a vehicle to stop operation if the determined difference is outside of the one or more predetermined ranges or does not satisfy the one or more predetermined criteria.

In Example 20, the non-transitory computer readable medium of any one of examples 16 to 19 is disclosed, wherein the instructions are further configured to cause the one or more processors to send a signal representing a sensor validation if the difference between the first testing data output and the second testing data output is within the one or more predetermined ranges or does not satisfy the one or more predetermined criteria.

In Example 21, the non-transitory computer readable medium of any one of examples 16 to 20 is disclosed, wherein the sensor deficiency information includes information representing mechanical damage to a sensor, mechanical damage to a sensor cover, one or more opaque obstructions in an optical path of a sensor, a reduction of sensor data quality due to sensor aging, or any combination thereof.

In Example 22, the non-transitory computer readable medium of any one of examples 16 to 21 is disclosed, wherein if the difference between the first testing data output and the second testing data output is outside of the one or more predetermined ranges or does not satisfy the one or more predetermined criteria, the instructions are further configured to cause the one or more processors to identify one or pixels corresponding to the difference and to disregard sensor information detected by the one or more pixels.

In Example 23, the non-transitory computer readable medium of example 22 is disclosed, wherein the instructions are further configured to cause the one or more processors to: determine revised sensor deficiency information representing a deficiency of the sensor in which the sensor information detected by the one or more pixels is disregarded; generate third testing data, the third testing data representing a modification of the first testing data by the revised sensor deficiency information in which the sensor information detected by the one or more pixels is disregarded; implement the artificial neural network to receive the third testing data in the input layer, process the third testing data; and output from the output layer a third testing data output; determine a difference between the first testing data output and the third testing data output; and if the difference between the first testing data output and the third testing data output is outside of the one or more predetermined ranges or does not satisfy the one or more predetermined criteria, send a signal representing a result of the determined difference.

In Example 24, the non-transitory computer readable medium of any one of examples 16 to 23 is disclosed, wherein the sensor is an image sensor, a camera sensor, a Light Detection and Ranging (LIDAR) sensor, a radar sensor, an acoustic sensor, or any combination thereof.

In Example 25, the non-transitory computer readable medium of any one of examples 16 to 24 is disclosed, wherein the instructions are further configured to cause the one or more processors to determine the deficiency of the sensor.

In Example 26, the non-transitory computer readable medium of example 25 is disclosed, wherein the instructions are further configured to cause the one or more processors to determine the deficiency of the sensor by determining a difference between actual sensor data of a pixel and expected sensor data of the pixel using at least two sensor data samples.

In Example 27, the non-transitory computer readable medium of any one of examples 16 to 26 is disclosed, further including an additional artificial neural network, including an input layer and an output layer is disclosed, wherein the additional artificial neural network is configured to receive sensor data representing an environment as detected by the sensor, process the sensor data, and output from the output layer modified sensor data representing the sensor data as modified to compensate for the sensor deficiency.

In Example 28, the non-transitory computer readable medium of example 27 is disclosed, wherein the instructions are further configured to cause the one or more processors to: implement the additional artificial neural network to receive modified sensor data in the input layer, process the modified sensor data, and output from the output layer a fourth testing data output; determine a difference between the first testing data output and the fourth testing data output; and if the difference between the first testing data output and the fourth testing data output is outside of the one or more predetermined ranges or does not satisfy the one or more predetermined criteria, send a signal representing a result of the determined difference.

In Example 29, the non-transitory computer readable medium of example 28 is disclosed, wherein the additional artificial neural network is configured to process the sensor data according to a generative adversarial network technique.

In Example 30, the non-transitory computer readable medium of any one of examples 16 to 29 is disclosed, wherein the first testing data and/or the second testing data are simulator data.

In Example 31, a method of sensor data evaluation is disclosed, including: receiving a first testing data output, representing an output of an artificial neural networking having received first testing data, wherein the first testing data represent sensor data of a working sensor (e.g. the first sensor) detecting a sensor input; receiving sensor deficiency information representing a deficiency of a sensor; generating second testing data, wherein the second testing data are based on the sensor deficiency information, and wherein the second testing data are different from the first testing data; implementing the artificial neural network to receive the second testing data in the input layer, process the second testing data; and output from the output layer a second testing data output; determining a difference between the first testing data output and the second testing data output; and if the difference between the first testing data output and the second testing data output is outside of one or more predetermined ranges or does not satisfy one or more predetermined criteria, sending a signal representing a result of the determined difference.

In Example 32, the method of sensor data evaluation of example 31 is disclosed, wherein the second testing data represent a modification of the first testing data by the sensor deficiency information to reflect the sensor input as detected by a sensor with the sensor deficiency.

In Example 33, the method of sensor data evaluation of example 31 or 32 is disclosed, wherein the difference between the first testing data output and second testing data output is a numerical difference, a statistical difference, probabilistic difference, a difference according to one or more rules, a difference according to one or more relationships, or any combination thereof.

In Example 34, the method of sensor data evaluation of any one of examples 31 to 33 is disclosed, further including sending a signal representing an instruction to a vehicle to stop operation if the determined difference is outside of the one or more predetermined ranges or does not satisfy the one or more predetermined criteria.

In Example 35, the method of sensor data evaluation of any one of examples 31 to 34 is disclosed, further including sending a signal representing a sensor validation if the difference between the first testing data output and the second testing data output is within the one or more predetermined ranges or satisfies the one or more predetermined criteria.

In Example 36, the method of sensor data evaluation of any one of examples 31 to 35 is disclosed, wherein the sensor deficiency information includes information representing mechanical damage to a sensor, mechanical damage to a sensor cover, one or more opaque obstructions in an optical path of a sensor, a reduction of sensor data quality due to sensor aging, or any combination thereof.

In Example 37, the method of sensor data evaluation of any one of examples 31 to 36 is disclosed, further including identifying one or pixels corresponding to the difference and to disregard sensor information detected by the one or more pixels if the difference between the first testing data output and the second testing data output is outside of the one or more predetermined ranges or does not satisfy the one or more predetermined criteria.

In Example 38, the method of sensor data evaluation of example 37 is disclosed, further including: determining revised sensor deficiency information, representing a deficiency of the sensor in which the sensor information detected by the one or more pixels is disregarded; generating third testing data, the third testing data representing a modification of the first testing data by the revised sensor deficiency information in which the sensor information detected by the one or more pixels is disregarded; implementing the artificial neural network to receive the third testing data in the input layer, process the third testing data; and output from the output layer a third testing data output; determining a difference between the first testing data output and the third testing data output; and if the difference between the first testing data output and the third testing data output is outside of the one or more predetermined ranges or does not satisfy the one or more predetermined criteria, sending a signal representing a result of the determined difference.

In Example 39, the method of sensor data evaluation of any one of examples 31 to 38 is disclosed, wherein the sensor is an image sensor, a camera sensor, a Light Detection and Ranging (LIDAR) sensor, a radar sensor, an acoustic sensor, or any combination thereof.

In Example 40, the method of sensor data evaluation of any one of examples 31 to 39 is disclosed, further including determining the deficiency of the sensor.

In Example 41, the method of sensor data evaluation of example 40 is disclosed, further including determining the deficiency of the sensor by determining a difference between actual sensor data of a pixel and expected sensor data of the pixel using at least two sensor data samples.

In Example 42, the method of sensor data evaluation of example 41 is disclosed, further including: implementing an artificial neural network to receive modified sensor data in the input layer, process the modified sensor data, and output from the output layer a fourth testing data output; wherein the additional artificial neural network includes an input layer and an output layer, and wherein the additional artificial neural network is configured to receive sensor data representing an environment as detected by the sensor, process the sensor data, and output from the output layer modified sensor data representing the sensor data as modified to compensate for the sensor deficiency; determining a difference between the first testing data output and the fourth testing data output; and if the difference between the first testing data output and the fourth testing data output is outside of the one or more predetermined ranges or does not satisfy the one or more predetermined criteria, send a signal representing a result of the determined difference.

In Example 43, the method of sensor data evaluation of example 42 is disclosed, wherein the additional artificial neural network is configured to process the sensor data according to a generative adversarial network technique.

In Example 44, the method of sensor data evaluation of any one of examples 31 to 43 is disclosed, wherein the first testing data and/or the second testing data are simulator data.

In Example 45, a means for sensor data evaluation is disclosed, including: an artificial neural networking means, including an input layer and an output layer, wherein the artificial neural network is configured to receive first testing data in the input layer, process the first testing data, and output from the output layer a first testing data output, wherein the first testing data represent sensor data of a working sensor (e.g. the first sensor) detecting a sensor input; and one or more processing means, configured to: receive sensor deficiency information representing a deficiency of a sensor; generate second testing data, wherein the second testing data are based on the sensor deficiency information, and wherein the second testing data are different from the first testing data; implement the artificial neural network to receive the second testing data in the input layer, process the second testing data; and output from the output layer a second testing data output; determine a difference between the first testing data output and the second testing data output; and if the difference between the first testing data output and the second testing data output is outside of one or more predetermined ranges or does not satisfy one or more predetermined criteria, send a signal representing a result of the determined difference.

In Example 46, the means for sensor data evaluation of example 45 is disclosed, wherein the second testing data represent a modification of the first testing data by the sensor deficiency information to reflect the sensor input as detected by a sensor with the sensor deficiency.

In Example 47, the means for sensor data evaluation of example 45 or 46 is disclosed, wherein the difference between the first testing data output and second testing data output is a numerical difference, a statistical difference, probabilistic difference, a difference according to one or more rules, a difference according to one or more relationships, or any combination thereof.

In Example 48, the means for sensor data evaluation of any one of examples 45 to 47 is disclosed, wherein the one or more processors are further configured to send a signal representing an instruction to a vehicle to stop operation if the determined difference is outside of the one or more predetermined ranges or does not satisfy the one or more predetermined criteria.

In Example 49, the means for sensor data evaluation of any one of examples 45 to 48 is disclosed, wherein the one or more processors are further configured to send a signal representing a sensor validation if the difference between the first testing data output and the second testing data output is within the one or more predetermined ranges or satisfies the one or more predetermined criteria.

In Example 50, the means for sensor data evaluation of any one of examples 45 to 49 is disclosed, wherein the sensor deficiency information includes information representing mechanical damage to a sensor, mechanical damage to a sensor cover, one or more opaque obstructions in an optical path of a sensor, a reduction of sensor data quality due to sensor aging, or any combination thereof.

In Example 51, the means for sensor data evaluation of any one of examples 45 to 50 is disclosed, wherein if the difference between the first testing data output and the second testing data output is outside of the one or more predetermined ranges or does not satisfy the one or more predetermined criteria, the one or more processors are further configured to identify one or pixels corresponding to the difference and to disregard sensor information detected by the one or more pixels.

In Example 52, the means for sensor data evaluation of example 51 is disclosed, wherein the one or more processors are further configured to: determine revised sensor deficiency information, representing a deficiency of the sensor in which the sensor information detected by the one or more pixels is disregarded; generate third testing data, the third testing data representing a modification of the first testing data by the revised sensor deficiency information in which the sensor information detected by the one or more pixels is disregarded; implement the artificial neural network to receive the third testing data in the input layer, process the third testing data; and output from the output layer a third testing data output; determine a difference between the first testing data output and the third testing data output; and if the difference between the first testing data output and the third testing data output is outside of the one or more predetermined ranges or does not satisfy the one or more predetermined criteria, send a signal representing a result of the determined difference.

In Example 53, the means for sensor data evaluation of any one of examples 45 to 52 is disclosed, wherein the sensor is an image sensor, a camera sensor, a Light Detection and Ranging (LIDAR) sensor, a radar sensor, an acoustic sensor, or any combination thereof.

In Example 54, the means for sensor data evaluation of any one of examples 45 to 54 is disclosed, wherein the one or more processors are further configured to determine the deficiency of the sensor.

In Example 55, the means for sensor data evaluation of example 54 is disclosed, wherein the one or more processors are further configured to determine the deficiency of the sensor by determining a difference between actual sensor data of a pixel and expected sensor data of the pixel using at least two sensor data samples.

In Example 56, the means for sensor data evaluation of any one of examples 45 to 55 is disclosed, further including an additional artificial neural network, including an input layer and an output layer is disclosed, wherein the additional artificial neural network is configured to receive sensor data representing an environment as detected by the sensor, process the sensor data, and output from the output layer modified sensor data representing the sensor data as modified to compensate for the sensor deficiency.

In Example 57, the means for sensor data evaluation of example 56 is disclosed, wherein the one or more processors are further configured to: implement the additional artificial neural network to receive modified sensor data in the input layer, process the modified sensor data, and output from the output layer a fourth testing data output; determine a difference between the first testing data output and the fourth testing data output; and if the difference between the first testing data output and the fourth testing data output is outside of the one or more predetermined ranges or does not satisfy the one or more predetermined criteria, send a signal representing a result of the determined difference.

In Example 58, the means for sensor data evaluation of example 57 is disclosed, wherein the additional artificial neural network is configured to process the sensor data according to a generative adversarial network technique.

In Example 59, the means for sensor data evaluation of any one of examples 45 to 58 is disclosed, wherein the first testing data and/or the second testing data are simulator data.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A sensor data evaluation device, comprising:
an artificial neural network, comprising an input layer and an output layer, wherein the artificial neural network is configured to receive first testing data in the input layer, process the first testing data, and output from the output layer a first testing data output, wherein the first testing data represent sensor data of a first sensor detecting a sensor input; and
one or more processors, configured to:
receive sensor deficiency information representing a deficiency of a second sensor;
generate second testing data, wherein the second testing data are based on the sensor deficiency information, and wherein the second testing data are different from the first testing data;
implement the artificial neural network to receive the second testing data in the input layer, process the second testing data; and output from the output layer a second testing data output;
determine a difference between the first testing data output and the second testing data output;
if the difference between the first testing data output and the second testing data output is outside of one or more predetermined ranges or does not satisfy one or more predetermined criteria, send a signal representing a result of the determined difference; and
wherein the one or more processors are further configured to send a signal representing an instruction to a vehicle to stop operation if the determined difference is outside of the one or more predetermined ranges or does not satisfy the one or more predetermined criteria.

2. The sensor data evaluation device of claim 1, wherein the second testing data represents a modification of the first testing data by the sensor deficiency information to reflect the sensor input as detected by the second sensor with the deficiency.

3. The sensor data evaluation device of claim 1, wherein the difference between the first testing data output and second testing data output is a numerical difference, a statistical difference, probabilistic difference, a difference according to one or more rules, a difference according to one or more relationships, or any combination thereof.

4. The sensor data evaluation device of claim 1, wherein the one or more processors are further configured to send a signal representing a sensor validation if the difference between the first testing data output and the second testing data output is within the one or more predetermined ranges or satisfies the one or more predetermined criteria.

5. The sensor data evaluation device of claim 1, wherein if the difference between the first testing data output and the second testing data output is outside of the one or more predetermined ranges or does not satisfy the one or more predetermined criteria, the one or more processors are further configured to identify one or more pixels corresponding to the difference and to disregard second sensor information detected by the one or more pixels.

6. The sensor data evaluation device of claim 5, wherein the one or more processors are further configured to:
determine revised sensor deficiency information, representing a deficiency of the second sensor in which the second sensor information detected by the one or more pixels is disregarded;
generate third testing data, the third testing data representing a modification of the first testing data by the revised sensor deficiency information in which the second sensor information detected by the one or more pixels is disregarded;
implement the artificial neural network to receive the third testing data in the input layer, process the third testing data; and output from the output layer a third testing data output;
determine a difference between the first testing data output and the third testing data output; and
if the difference between the first testing data output and the third testing data output is outside of the one or more predetermined ranges or does not satisfy the one or more predetermined criteria, send a signal representing a result of the determined difference between the first testing data output and the third testing data output.

7. The sensor data evaluation device of claim 1, wherein the second sensor is an image sensor, a camera sensor, a Light Detection and Ranging (LIDAR) sensor, a radar sensor, an acoustic sensor, or any combination thereof.

8. The sensor data evaluation device of claim 1, further comprising an additional artificial neural network, comprising an input layer and an output layer, wherein the additional artificial neural network is configured to receive second sensor data representing an environment as detected by the second sensor, process the second sensor data, and output from the output layer modified second sensor data representing the second sensor data as modified to compensate for the deficiency.

9. The sensor data evaluation device of claim 8, wherein the one or more processors are further configured to:
implement the additional artificial neural network to receive the modified second sensor data in the input layer, process the modified second sensor data, and output from the output layer a fourth testing data output;
determine a difference between the first testing data output and the fourth testing data output; and
if the difference between the first testing data output and the fourth testing data output is outside of the one or more predetermined ranges or does not satisfy the one or more predetermined criteria, send a signal representing a result of the determined difference.

10. The sensor data evaluation device of claim 9, wherein the additional artificial neural network is configured to process the second sensor data according to a generative adversarial network technique.

11. A non-transitory computer readable medium, comprising instructions which, when executed, cause one or more processors to:
receive a first testing data output, representing an output of an artificial neural network having received first testing data, wherein the first testing data represent sensor data of a first sensor detecting a sensor input;
receive sensor deficiency information representing a deficiency of a second sensor;
generate second testing data from the first testing data, wherein the second testing data are based on the sensor deficiency information, and wherein the second testing data are different from the first testing data;

implement the artificial neural network to receive the second testing data, process the second testing data; and output a second testing data output;

determine a difference between the first testing data output and the second testing data output;

if the difference between the first testing data output and the second testing data output is outside of one or more predetermined ranges or does not satisfy one or more predetermined criteria, send a signal representing a result of the determined difference; and wherein the instructions are further configured to cause the one or more processors to send a signal representing an instruction to a vehicle to stop operation if the determined difference is outside of the one or more predetermined ranges or does not satisfy the one or more predetermined criteria.

12. The non-transitory computer readable medium of claim 11, wherein the second testing data represent a modification of the first testing data by the deficiency information to reflect the sensor input as detected by a sensor with the deficiency.

13. The non-transitory computer readable medium of claim 11, wherein the difference between the first testing data output and second testing data output is a numerical difference, a statistical difference, probabilistic difference, a difference according to one or more rules, a difference according to one or more relationships, or any combination thereof.

14. The non-transitory computer readable medium of claim 11, wherein the instructions are further configured to cause the one or more processors to send a signal representing a second sensor validation if the difference between the first testing data output and the second testing data output is within the one or more predetermined ranges or satisfies the one or more predetermined criteria.

15. The non-transitory computer readable medium of claim 11, wherein if the difference between the first testing data output and the second testing data output is outside of the one or more predetermined ranges or does not satisfy the one or more predetermined criteria, the instructions are further configured to cause the one or more processors to identify one or more pixels corresponding to the difference and to disregard sensor information detected by the one or more pixels.

16. The non-transitory computer readable medium of claim 15, wherein the instructions are further configured to cause the one or more processors to:

determine revised sensor deficiency information representing a deficiency of the second sensor in which the sensor information detected by the one or more pixels is disregarded;

generate third testing data, the third testing data representing a modification of the first testing data by the revised sensor deficiency information in which the sensor information detected by the one or more pixels is disregarded;

implement the artificial neural network to receive the third testing data in an input layer, process the third testing data; and output third testing data output;

determine a difference between the first testing data output and the third testing data output; and if the difference between the first testing data output and the third testing data output is outside of the one or more predetermined ranges or does not satisfy one or more predetermined criteria, send a signal representing a result of the determined difference between the first testing data output and the third testing data output.

17. An apparatus comprising:
one or more processors;
a memory, coupled to the one or more processors, the memory storing instructions that when executed by the one or more processors cause the one or more processors to:

receive a first testing data output, representing an output of an artificial neural network having received first testing data, wherein the first testing data represent sensor data of a first sensor detecting a sensor input;

receive sensor deficiency information representing a deficiency of a second sensor;

generate second testing data, wherein the second testing data are based on the sensor deficiency information, and wherein the second testing data are different from the first testing data;

implement the artificial neural network to receive the second testing data in an input layer, process the second testing data; and output from an output layer a second testing data output;

determine a difference between the first testing data output and the second testing data output;

if the difference between the first testing data output and the second testing data output is outside of one or more predetermined ranges or does not satisfy one or more predetermined criteria, send a signal representing a result of the determined difference; and wherein the one or more processors are further configured to send a signal representing an instruction to a vehicle to stop operation if the determined difference is outside of the one or more predetermined ranges or does not satisfy the one or more predetermined criteria.

18. The apparatus of claim 17, wherein the instructions are further configured to cause the one or more processors to identify one or more pixels corresponding to the difference and to disregard sensor information detected by the one or more pixels if the difference between the first testing data output and the second testing data output is outside of the one or more predetermined ranges or does not satisfy the one or more predetermined criteria;

determine revised sensor deficiency information, representing a deficiency of the second sensor in which the sensor information detected by the one or more pixels is disregarded;

generate third testing data, the third testing data representing a modification of the first testing data by the revised sensor deficiency information in which the sensor information detected by the one or more pixels is disregarded;

implement the artificial neural network to receive the third testing data in the input layer, process the third testing data; and output from the output layer a third testing data output;

determine a difference between the first testing data output and the third testing data output; and if the difference between the first testing data output and the third testing data output is outside of the one or more predetermined ranges or does not satisfy the one or more predetermined criteria, send a signal representing a result of the determined difference between the first testing data output and the third testing data output.

* * * * *